(12) United States Patent
Hirohata et al.

(10) Patent No.: US 12,737,797 B2
(45) Date of Patent: Sep. 15, 2026

(54) SIMULATION DEVICE FOR DETERMINING ELECTRIC VEHICLE SUITABILITY

(71) Applicant: HONDA MOTOR CO., LTD., Tokyo (JP)

(72) Inventors: Kei Hirohata, Tokyo (JP); Hiroaki Maruyama, Tokyo (JP); Jun Ohashi, Tokyo (JP); Naohiro Akuzawa, Tokyo (JP); Daisuke Ide, Tokyo (JP); Yohei Umemoto, Tokyo (JP); Adil Gupta, Tokyo (JP); Takayuki Suzuike, Tokyo (JP); Minoru Suzuki, Tokyo (JP); Shinya Miwa, Tokyo (JP); Yui Nishio, Tokyo (JP)

(73) Assignee: Honda Motor Co., Ltd., Tokyo (JP)

( * ) Notice: Subject to any disclaimer, the term of this patent is extended or adjusted under 35 U.S.C. 154(b) by 211 days.

(21) Appl. No.: 18/126,675

(22) Filed: Mar. 27, 2023

(65) Prior Publication Data

US 2023/0316822 A1 Oct. 5, 2023

(30) Foreign Application Priority Data

Mar. 30, 2022 (JP) ................................ 2022-057078

(51) Int. Cl.
*G06Q 30/0601* (2023.01)
*G01C 21/34* (2006.01)

(52) U.S. Cl.
CPC ..... *G06Q 30/0631* (2013.01); *G01C 21/3469* (2013.01)

(58) Field of Classification Search
CPC ........... G06Q 30/0631; G06Q 30/0601; G01C 21/3469
See application file for complete search history.

(56) References Cited

U.S. PATENT DOCUMENTS

2015/0073933 A1* 3/2015 Stieg .................. G06Q 30/0631 705/26.7
2015/0151637 A1* 6/2015 Suzuki ...................... B60L 3/12 701/22

(Continued)

FOREIGN PATENT DOCUMENTS

JP 2003-108812 A 4/2003
JP 2006321429 A * 11/2006

(Continued)

OTHER PUBLICATIONS

Machine Translation of JP 2006321429 A (Year: 2006).*

(Continued)

*Primary Examiner* — Scott A Browne
*Assistant Examiner* — Jisun Choi
(74) *Attorney, Agent, or Firm* — Carrier, Shende & Associates P.C.; Fulchand P. Shende; Joseph P. Carrier

(57) ABSTRACT

A simulation device includes a travel information acquisition unit that acquires travel information including a plurality of items relating to a travel history from an internal combustion engine vehicle equipped with an internal combustion engine, a storage device that stores reference values of suitability of a user for an electric vehicle with respect to electric power consumption, respectively, for the items, a determination unit that determines the suitability based on a comparison result between measurement values of the respective items and the reference values, and an output unit that causes an information terminal of the user to output the determined suitability.

8 Claims, 9 Drawing Sheets

(56) References Cited

U.S. PATENT DOCUMENTS

2015/0256877 A1 9/2015 Yoneda et al.
2021/0171047 A1* 6/2021 Tanimori ........... G06Q 30/0621

FOREIGN PATENT DOCUMENTS

JP 2008-216500 A 9/2008
JP 2014-235709 A 12/2014
WO 2015/037186 A1 3/2015

OTHER PUBLICATIONS

Office Action dated Jun. 20, 2023 in the corresponding Japanese Patent Application 2022-057078 with the English machine translation thereof.

* cited by examiner

10
SIMULATION DEVICE
PROCESSING CIRCUIT
60
TRAVEL INFORMATION ACQUISITION UNIT
100
CHARGING CONVENIENCE INFORMATION ACQUISITION UNIT
110
DETERMINATION UNIT
120
OUTPUT UNIT
130
STORAGE DEVICE
70

FIG. 3

| | INFORMATION ACQUISITION TIME | AVERAGE VELOCITY | ACCELERATOR OPENING AVERAGE VALUE | BRAKE PEDAL DEPRESSION AMOUNT AVERAGE VALUE | TOTAL TRAVEL DISTANCE | AIR CONDITIONER SETTING CHANGE FREQUENCY |
|---|---|---|---|---|---|---|
| 150 | T1 | V1 | A1 | B1 | D1 | F1 |
| 150 | T2 | V2 | A2 | B2 | D2 | F2 |
| | ⋮ | ⋮ | ⋮ | ⋮ | ⋮ | ⋮ |
| 150 | TK | VK | AK | BK | DK | FK |
| | ⋮ | ⋮ | ⋮ | ⋮ | ⋮ | ⋮ |

| VEHICLE TYPE | AVERAGE VELOCITY | ACCELERATOR OPENING AVERAGE VALUE | BRAKE PEDAL DEPRESSION AMOUNT AVERAGE VALUE | TOTAL TRAVEL DISTANCE | AIR CONDITIONER SETTING CHANGE FREQUENCY |
|---|---|---|---|---|---|
| E1 | VL1 | AL1 | BL1 | DL1 | FL1 |
| E2 | VL2 | AL2 | BL2 | DL2 | FL2 |
| E3 | VL3 | AL3 | BL3 | DL3 | FL3 |

| VEHICLE TYPE | AVERAGE VELOCITY | ACCELERATOR OPENING AVERAGE VALUE | BRAKE PEDAL DEPRESSION AMOUNT AVERAGE VALUE | TOTAL TRAVEL DISTANCE | AIR CONDITIONER SETTING CHANGE FREQUENCY |
|---|---|---|---|---|---|
| E1 | VU1 | AU1 | BU1 | DU1 | FU1 |
| E2 | VU2 | AU2 | BU2 | DU2 | FU2 |
| E3 | VU3 | AU3 | BU3 | DU3 | FU3 |

| | CONVENIENCE OF CHARGING |
|---|---|
| THERE IS CHARGING EQUIPMENT IN PARKING LOT | 10 |
| THERE IS CHARGING EQUIPMENT IN THE VICINITY OF PARKING LOT (WITHIN 200 m) | 5 |
| THERE IS NO CHARGING EQUIPMENT IN THE VICINITY OF PARKING LOT (WITHIN 200 m) | 0 |

FIG. 6

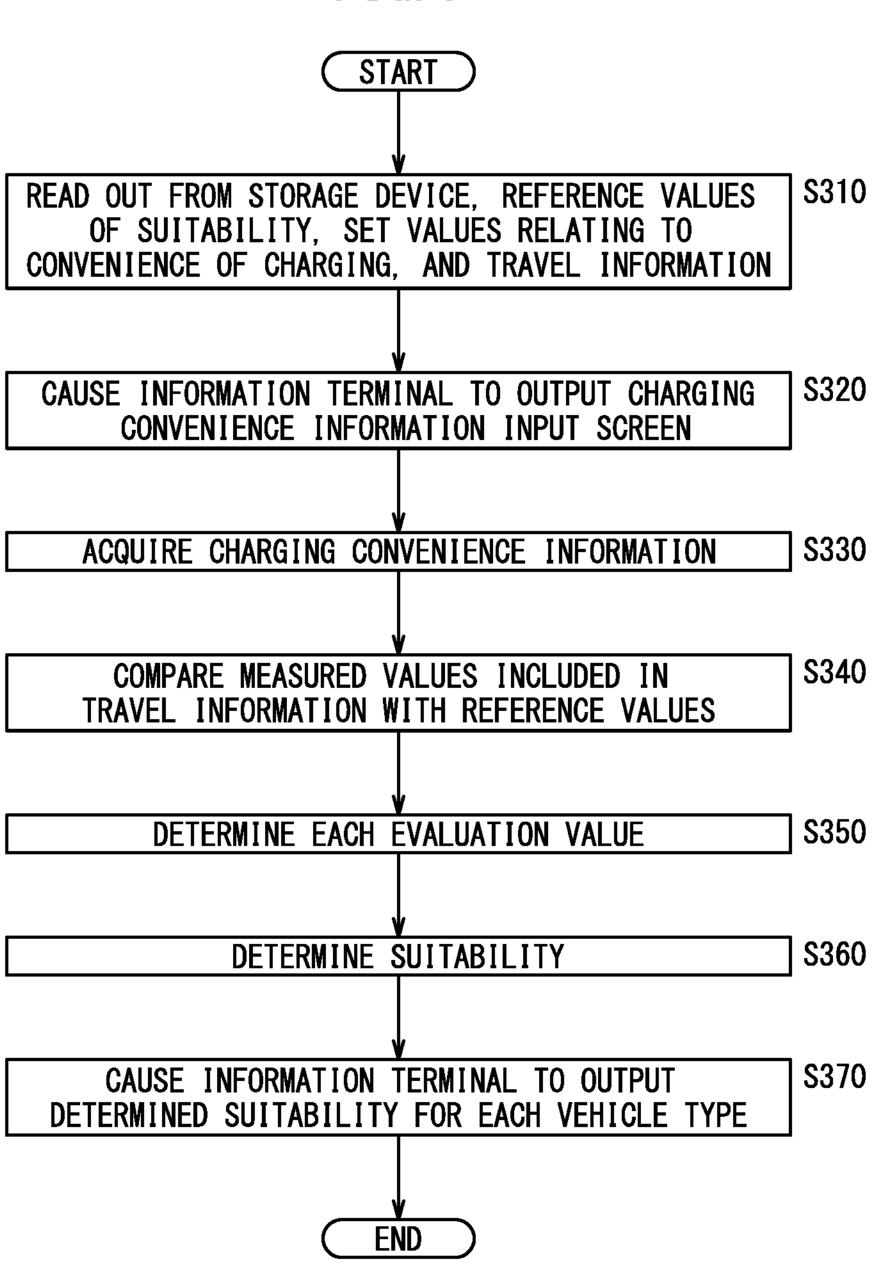
FIG. 9
START
READ OUT FROM STORAGE DEVICE, REFERENCE VALUES OF SUITABILITY, SET VALUES RELATING TO CONVENIENCE OF CHARGING, AND TRAVEL INFORMATION
S310
CAUSE INFORMATION TERMINAL TO OUTPUT CHARGING CONVENIENCE INFORMATION INPUT SCREEN
S320
ACQUIRE CHARGING CONVENIENCE INFORMATION
S330
COMPARE MEASURED VALUES INCLUDED IN TRAVEL INFORMATION WITH REFERENCE VALUES
S340
DETERMINE EACH EVALUATION VALUE
S350
DETERMINE SUITABILITY
S360
CAUSE INFORMATION TERMINAL TO OUTPUT DETERMINED SUITABILITY FOR EACH VEHICLE TYPE
S370
END

SIMULATION DEVICE FOR DETERMINING ELECTRIC VEHICLE SUITABILITY

CROSS-REFERENCE TO RELATED APPLICATIONS

This application is based upon and claims the benefit of priority from Japanese Patent Application No. 2022-057078 filed on Mar. 30, 2022, the contents of which are incorporated herein by reference.

BACKGROUND OF THE INVENTION

Field of the Invention

The present invention relates to a simulation device.

Description of the Related Art

JP 2014-235709 A discloses an electric energy consumption estimating apparatus for estimating the electric energy in a battery consumed by an electric vehicle.

SUMMARY OF THE INVENTION

According to the disclosure of JP 2014-235709 A, it is possible to estimate the electric energy required for daily use of an electric vehicle from statistical data. However, when a user uses an electric vehicle on a daily basis, the user cannot determine whether or not his/her mode of use is close to a mode utilized for the statistical data. Therefore, there is a problem that the user cannot recognize whether or not the electric vehicle is suitable for him/her. Therefore, there are some users who hesitate to buy an electric vehicle to replace his/her internal combustion engine vehicle.

An object of the present invention is to solve the aforementioned problem.

A simulation device according to an aspect of the present invention includes a travel information acquisition unit configured to acquire from an internal combustion engine vehicle equipped with an internal combustion engine, travel information including a plurality of items relating to a travel history of the internal combustion engine vehicle, a storage device configured to store reference values of suitability of a user for the electric vehicle with respect to electric power consumption, a determination unit configured to determine the suitability based on a comparison result between measurement values of the respective items included in the travel information and the reference values, and an output unit configured to cause an information terminal of the user to output the determined suitability.

According to the present invention, each user can recognize whether or not the electric vehicle is suitable for him/her.

The above and other objects, features, and advantages of the present invention will become more apparent from the following description when taken in conjunction with the accompanying drawings, in which a preferred embodiment of the present invention is shown by way of illustrative example.

BRIEF DESCRIPTION OF THE DRAWINGS

FIG. 3 is a diagram exemplifying travel information stored in a storage device;

FIG. 4A is a diagram illustrating a table in which lower limits of reference values of suitability for each electric vehicle are set;

FIG. 4B is a diagram illustrating a table in which upper limits of the reference valued of suitability for each electric vehicle are set;

FIG. 5 is a diagram exemplifying set values related to convenience of charging for an electric vehicle;

FIG. 6 is a diagram exemplifying a screen displayed for a user to input charging convenience information into an information terminal;

FIG. 9 is a flowchart illustrating a processing procedure relating to determination of suitability for the electric vehicle by the simulation device.

DETAILED DESCRIPTION OF THE INVENTION

Figure 1:
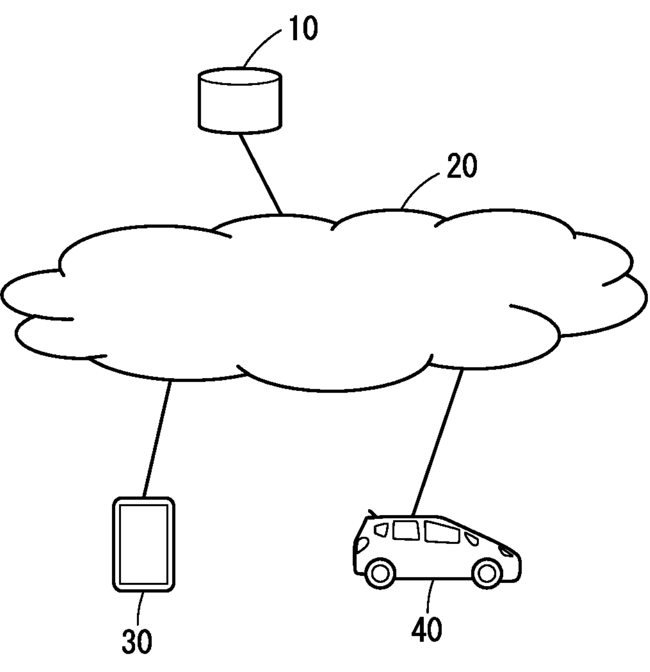
FIG. 1 is a diagram exemplifying a network connection configuration of a simulation device according to an embodiment.

FIG. 1 is a diagram exemplifying a network connection configuration of a simulation device 10 according to an embodiment. An information terminal 30 of a user and an internal combustion engine vehicle 40 of the user are connected to the simulation device 10 via a communication network 20.

Figure 2:
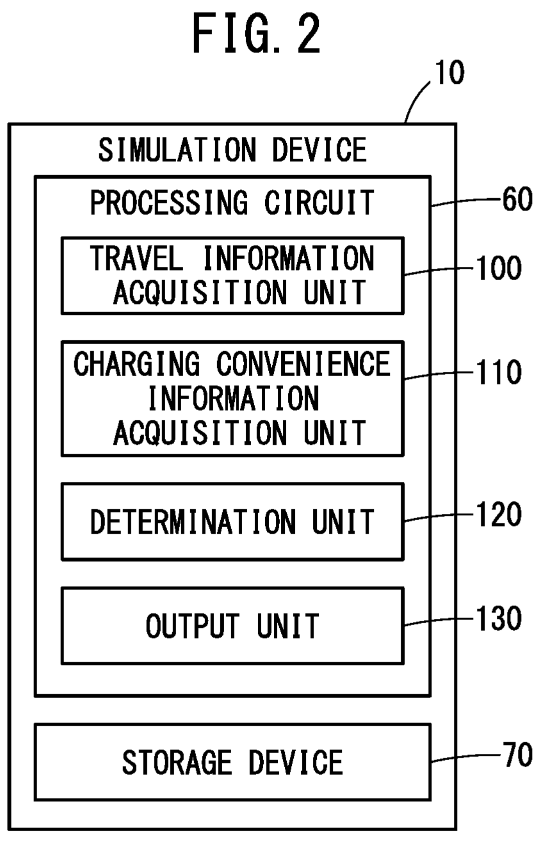
FIG. 2 is a block diagram illustrating the configuration of the simulation device.

FIG. 2 is a block diagram illustrating the configuration of the simulation device 10. The simulation device 10 includes a processing circuit 60 and a storage device 70. The processing circuit 60 includes a processor such as a CPU or a GPU. The storage device 70 includes a volatile memory such as a RAM and a non-volatile memory such as a ROM or a flash memory. The volatile memory is used as a working memory of the processor. The non-volatile memory stores programs executed by the processor and other necessary data.

The processing circuit 60 includes a travel information acquisition unit 100, a charging convenience information acquisition unit 110, a determination unit 120, and an output unit 130. When the processing circuit 60 executes the program stored in the storage device 70, the travel information acquisition unit 100, the charging convenience information acquisition unit 110, the determination unit 120, and the output unit 130 are implemented. At least a part of the travel information acquisition unit 100, the charging convenience information acquisition unit 110, the determination unit 120, and the output unit 130 may be implemented by an integrated circuit such as an ASIC or an FPGA or an electronic circuit including a discrete device.

The travel information acquisition unit 100 acquires travel information including a travel history of the internal combustion engine vehicle 40 from the internal combustion engine vehicle 40. The travel information includes a plurality of items relating to the travel history. The plurality of items are, for example, an average speed, an average value of accelerator opening (accelerator opening average value), an average value of depression amounts of brake pedal (brake pedal depression amount average value), a total travel distance, and a frequency of changing temperature setting of an air conditioner.

The average speed and the total travel distance are measured based on, for example, sensor data of a speed sensor or a positioning sensor mounted on the internal combustion engine vehicle 40 and the time when the sensor data are acquired. The accelerator opening average value is a value obtained by integrating the accelerator opening each time an accelerator pedal is depressed and dividing the integrated value by the number of times the accelerator pedal is depressed. The accelerator opening average value is measured based on, for example, sensor data of a depression amount detection sensor of the accelerator pedal and the time when the sensor data are acquired.

The brake pedal depression amount average value is obtained by integrating the brake pedal depression amount each time the brake pedal is depressed and dividing the integrated value by the number of times the brake pedal is depressed. The brake pedal depression amount average value is measured based on, for example, sensor data of a brake pedal depression amount detection sensor and the time when the sensor data are acquired. The frequency at which the temperature setting of the air conditioner is changed is measured based on the occurrence history data of starting operation, stopping operation and temperature setting change operation of the air conditioner by the user and the time at which the occurrence history data are acquired.

In the present embodiment, the above-mentioned measurement values of the plurality of items described above are obtained by performing calculations in the internal combustion engine vehicle 40, using the various data. However, the travel information acquisition unit 100 may acquire the various data from the internal combustion engine vehicle 40, and the travel information acquisition unit 100 may perform calculations using the acquired data. Based on the acquired travel information, the travel information acquisition unit 100 stores measurement values of a plurality of items related to the travel history of the internal combustion engine vehicle 40 in the storage device 70, together with the time when the travel information was acquired.

In the present embodiment, the user uses a parking lot at home (also referred to as a home parking lot) as a storage location of the internal combustion engine vehicle 40. In this case, it is assumed that when the user switches from the use of the internal combustion engine vehicle 40 to the use of an electric vehicle, the electric vehicle is stored in the home parking lot on a daily basis. A storage location of the internal combustion engine vehicle 40 may be a parking lot other than the home parking lot of the user. For example, the storage location may be a parking lot in the vicinity of the home.

The charging convenience information acquisition unit 110 acquires charging convenience information relating to the convenience of charging for the electric vehicle. The user inputs the charging convenience information into a charging convenience information input screen displayed on the information terminal 30. The charging convenience information acquisition unit 110 acquires the input charging convenience information from the information terminal 30.

In the storage device 70, reference values of the suitability for the electric vehicle are stored for the respective items related to the travel history included in the travel information. The determination unit 120 compares the measured value of each item related to the travel history with the reference value to determine an evaluation value of each item. The determination unit 120 determines the evaluation value relating to the convenience of charging further based on the charging convenience information. The determination unit 120 determines the suitability of the user for the electric vehicle about the electric power consumption, based on the evaluation value of each item related to the travel history and the evaluation value related to the convenience in charging the electric vehicle.

The output unit 130 causes the information terminal 30 of the user to output the above-mentioned charging convenience information input screen. When the determination unit 120 determines the suitability of the user for the electric vehicle, the output unit 130 causes the information terminal 30 of the user to output the suitability together with the evaluation values.

FIG. 3 is a diagram exemplifying travel information 150 stored in the storage device 70. The travel information 150 is repeatedly transmitted from the internal combustion engine vehicle 40 to the simulation device 10. Measurement values of the plurality of items related to the travel history are included in the travel information 150. The measurement values of the plurality of items are stored in the storage device 70 together with the acquisition time of the travel information 150. The travel information 150 stored in this manner is associated with a vehicle ID of the internal combustion engine vehicle 40, a user ID of the internal combustion engine vehicle 40, and a terminal ID of the information terminal 30 operated by the user.

FIG. 4A is a diagram illustrating a table 170 in which lower limits of the reference values of suitability for each electric vehicle are set. FIG. 4B is a diagram showing a table 174 in which upper limits of the reference values of the suitability for each electric vehicle are set. The lower limits and the upper limits of the reference values of the suitability are set in advance in the tables 170 and 174 corresponding to each of the plurality of items described above, for each vehicle type of electric vehicle. The lower limits and the upper limits of the reference values of the suitability are set, for example, according to the characteristics of each vehicle type of electric vehicle. Further, the lower limits and the upper limits of the reference values of the suitability may be set such that for each item, a half value of the sum of the lower limit and the upper limit of the reference value of the suitability coincides with an average value of users for each vehicle type of the electric vehicle.

The tables 170 and 174 are stored in the storage device 70. FIGS. 4A and 4B illustrate the lower limits and the upper limits of the reference values corresponding to each of the vehicle types E1, E2, and E3. The lower limits and the upper limits of the reference values of suitability are used in the determination of each of the evaluation values by the determination unit 120.

As a measurement value at information acquisition time T1 shown in FIG. 3, an average velocity V1 is read out from the storage device 70 by the determination unit 120. The determination unit 120 compares the average speed V1, which is a measured value, with a reference value lower limit VL1 and a reference value upper limit VU1 of the average speed corresponding to the vehicle type E1 shown in FIGS. 4A and 4B. If the average speed V1 is equal to or lower than the reference value lower limit VL1, the evaluation value of the average speed V1 corresponding to the vehicle type E1 is determined to be 18, for example. If the average speed V1 is equal to or higher than the reference value upper limit VU1, the evaluation value of the average speed V1 corresponding to the vehicle type E1 is determined to be 0, for example.

If the average speed V1 is higher than the reference value lower limit VL1 and lower than the reference value upper limit VU1, the evaluation value of the average speed V1 corresponding to the vehicle type E1 is determined to be a value higher than 0 and lower than 18. In the case of an electric vehicle, the higher the average speed V1 is, the larger the power consumption is, so that the evaluation value becomes lower. The same applies to the vehicle types E2 and E3 other than the vehicle type E1.

As a measurement value at the information acquisition time T1 shown in FIG. 3, an accelerator opening average value A1 is read out from the storage device 70 by the determination unit 120. The determination unit 120 compares the accelerator opening average value A1, which is a measurement value, with a reference value lower limit AL1 and a reference value upper limit AU1 of the average value of the accelerator opening corresponding to the vehicle type E1 shown in FIGS. 4A and 4B. If the accelerator opening average value A1 is equal to or lower than the reference value lower limit AL1, the evaluation value of the accelerator opening average value A1 corresponding to the vehicle type E1 is determined to be 18, for example. If the accelerator opening average value A1 is equal to or larger than the reference value upper limit AU1, the evaluation value of the accelerator opening average value A1 of corresponding to the vehicle type E1 is determined to be 0, for example.

If the accelerator opening average value A1 is larger than the reference value lower limit AL1 and smaller than the reference value upper limit AU1, the evaluation value of the accelerator opening average value A1 corresponding to the vehicle type E1 is determined to be a value larger than 0 and smaller than 18. In the case of an electric vehicle, the larger the accelerator opening average value A1 is, the larger the electric power consumption is, so that the evaluation value becomes lower. The same applies to the vehicle types E2 and E3 other than the vehicle type E1.

As a measurement value at the information acquisition time T1 shown in FIG. 3, a brake pedal depression amount average value B1 is read out from the storage device 70 by the determination unit 120. The determination unit 120 compares the brake pedal depression amount average value B1, which is a measured value, with the reference value lower limit BL1 and the reference value upper limit BU1 of the average value of the brake pedal depression amount corresponding to the vehicle type E1 shown in FIGS. 4A and 4B. If the brake pedal depression amount average value B1 is equal to or less than the reference value lower limit BL1, the evaluation value of the brake pedal depression amount average value B1 corresponding to the vehicle type E1 is determined to be 18, for example. If the brake pedal depression amount average value B1 is equal to or larger than the reference value upper limit BU1, the evaluation value of the brake pedal depression amount average value B1 corresponding to the vehicle type E1 is determined to be 0, for example.

If the brake pedal depression amount average value B1 is larger than the reference value lower limit BL1 and smaller than the reference value upper limit BU1, the evaluation value of the brake pedal depression amount average value B1 corresponding to the vehicle type E1 is determined to be a value larger than 0 and smaller than 18. In the case of an electric vehicle, the larger the brake pedal depression amount average value B1 is, the larger the electric power consumption is, so that the evaluation value becomes lower. The same applies to the vehicle types E2 and E3 other than the vehicle type E1.

As a measurement value at the information acquisition time T1 shown in FIG. 3, a total travel distance D1 is read out from the storage device 70 by the determination unit 120. The determination unit 120 compares the total travel distance D1, which is a measurement value, with the reference value lower limit DL1 and the reference value upper limit DU1 of the total travel distance corresponding to the vehicle type E1 shown in FIGS. 4A and 4B. If the total travel distance D1 is equal to or smaller than the reference value lower limit DL1, the evaluation value of the total travel distance D1 corresponding to the vehicle type E1 is determined to be 0, for example. If the total travel distance D1 is equal to or larger than the reference value upper limit DU1, the evaluation value of the total travel distance D1 corresponding to the vehicle type E1 is determined to be 18, for example.

If the total travel distance D1 is larger than the reference value lower limit DL1 and smaller than the reference value upper limit DU1, the evaluation value of the total travel distance D1 corresponding to the vehicle type E1 is determined to be a value larger than 0 and smaller than 18. In the case of an electric vehicle, the larger the total travel distance D1 is, the higher the evaluation value becomes. The same applies to the vehicle types E2 and E3 other than the vehicle type E1.

The reason why the evaluation value becomes higher as the total travel distance D1 becomes larger will be described. If the travel distance of the electric vehicle and the travel distance of the internal combustion engine vehicle 40 are equal, the cost of the electric power consumed by the electric vehicle is smaller than the cost of the fuel consumed by the internal combustion engine vehicle 40. Therefore, the longer the travel distance is, the greater the difference between the electric power cost and the fuel cost. Further, in the internal combustion engine vehicle 40, some parts which need to be replaced when the travel distance becomes long are used. Therefore, as the travel distance becomes longer, the cost of parts of the internal combustion engine vehicle 40 increases. For the above reason, the longer the total travel distance D1 is, the higher the evaluation value becomes.

As a measurement value at the information acquisition time T1 shown in FIG. 3, a frequency F1 at which the temperature setting of the air conditioner is changed by the user (hereinafter referred to as an air conditioner setting change frequency) is read out from the storage device 70 by the determination unit 120. The determination unit 120 compares the air conditioner setting change frequency F1, which is a measurement value, with a reference value lower limit FL1 and a reference value upper limit FU1 of the air conditioner setting change frequency corresponding to the vehicle type E1 shown in FIGS. 4A and 4B. If the air conditioner setting change frequency F1 is equal to or lower than the reference value lower limit FL1, the evaluation value of the air conditioner setting change frequency F1 corresponding to the vehicle type E1 is determined to be 18, for example. If the air conditioner setting change frequency F1 is equal to or higher than the reference value upper limit FU1, the evaluation value of the air conditioner setting change frequency F1 corresponding to the vehicle type E1 is determined to be 0, for example.

If the air conditioner setting change frequency F1 is higher than the reference value lower limit FL1 and lower than the reference value upper limit FU1, the evaluation value of the air conditioner setting change frequency F1 corresponding to the vehicle type E1 is determined to be a value higher than 0 and lower than 18. In the case of an electric vehicle, the higher the air conditioner setting change frequency F1 is, the larger the electric power consumption is, so that the evaluation value becomes lower. The same applies to the vehicle types E2 and E3 other than the vehicle type E1.

As the reason why the electric power consumption increases as the air conditioner setting change frequency F1 is, the following is considered. A user whose air conditioner setting change frequency F1 is high tends to change a set temperature of the air conditioner frequently, because the user does not want to lose comfort due to the change of the outside air temperature. Accordingly, by frequently changing the set temperature of the air conditioner, a state in which the difference between the set temperature of the air conditioner and the outside air temperature is large is maintained for a long time. As a result, the higher the air conditioner setting change frequency F1 is, the greater the power consumption becomes.

FIG. 5 is a diagram exemplifying set values 180 related to convenience of charging for an electric vehicle. The set values 180 relating to the convenience of charging are stored in the storage device 70 in advance. Based on the set values 180 and the charging convenience information acquired by the charging convenience information acquisition unit 110, an evaluation value relating to the convenience of charging is determined. The evaluation value does not depend on the vehicle type of the electric vehicle. The higher the convenience of charging, the larger the evaluation value is. If the charging convenience information indicates that there is charging equipment in the parking lot of the user's home, the evaluation value for the convenience of charging is determined to be 10, for example.

If the charging convenience information indicates that the charging equipment is located in the vicinity of the parking lot of the user's home, the evaluation value for the convenience of charging is determined to be 5, for example. The fact that the charging equipment is located in the vicinity of the home parking lot means that a distance between the home parking lot and the charging equipment is within a predetermined distance (for example, 200 m).

If the charging convenience information indicates that there is no charging equipment in the vicinity of the home parking lot, the evaluation value relating to the convenience of charging is determined to be 0, for example. The fact that there is no charging equipment in the vicinity of the home parking lot, corresponds to the fact that the distance between the home parking lot and the charging equipment exceeds a predetermined distance (for example, 200 m).

Figure 6:
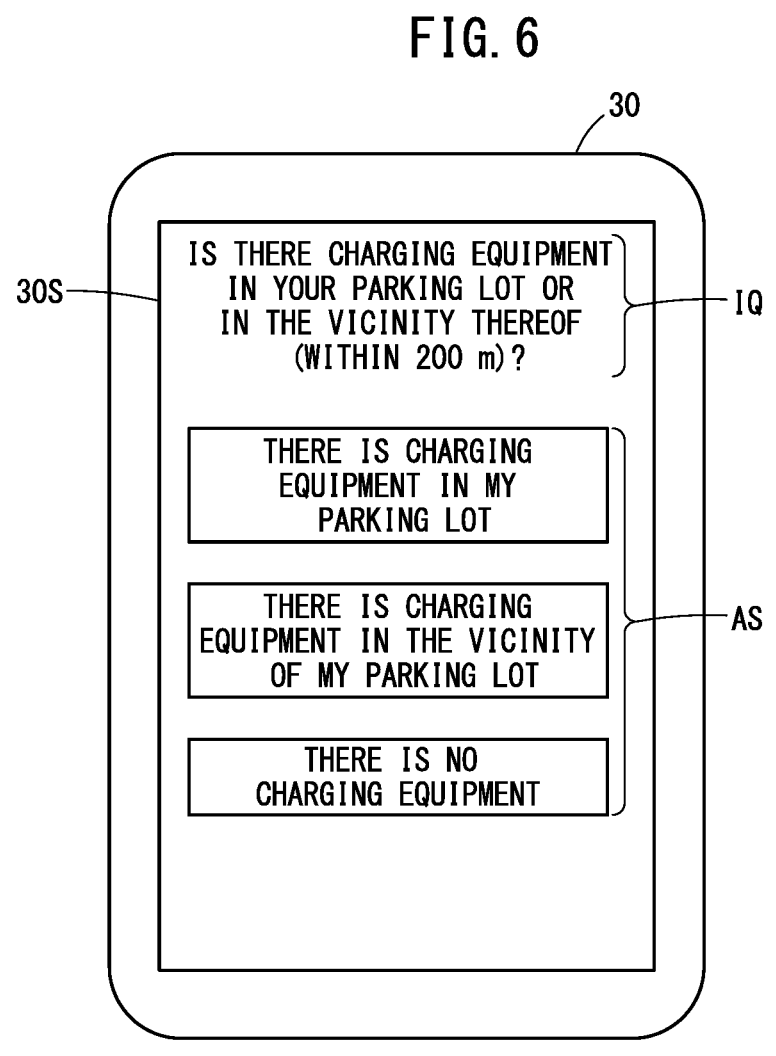

Next, a screen displayed on the user's information terminal 30 will be described. FIG. 6 is a diagram exemplifying a screen displayed for a user to input charging convenience information into the information terminal 30. The output unit 130 causes a display unit 30S of the information terminal 30 of the user to output the charging convenience information input screen. On the charging convenience information input screen, an inquiry IQ regarding whether or not there is charging equipment in the parking lot of the user's home or in the vicinity of the parking lot, and an image AS of buttons for answering the inquiry IQ, are displayed.

In FIG. 6, three buttons are illustrated as the buttons of the image AS. A first button is for the user to touch if there is charging equipment in the home parking lot. A second button is for the user to touch if the charging equipment is located in the vicinity of the home parking lot. A third button is for the user to touch if there is no charging equipment in the vicinity of the home parking lot. When the user touches any one of the buttons of the displayed image AS, the charging convenience information is input. Thus, the charging convenience information acquisition unit 110 can acquire the charging convenience information of the user.

Figure 7:
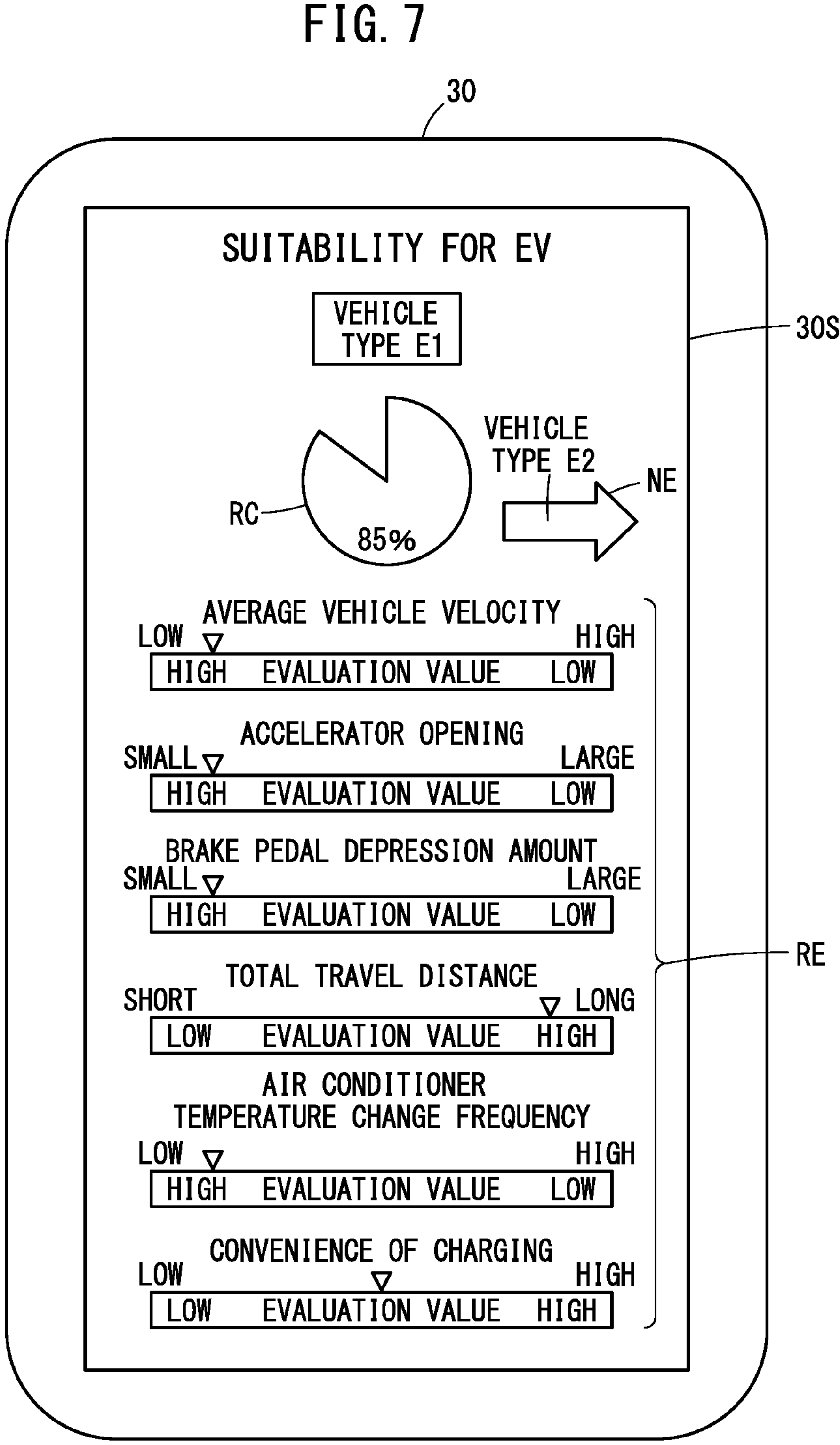
FIG. 7 is a diagram illustrating a state where a determination result of suitability for an electric vehicle is output to the information terminal of the user.

FIG. 7 is a diagram illustrating a state where a determination result of suitability for an electric vehicle is output to the information terminal 30 of the user. When the determination unit 120 determines the suitability of the user for the electric vehicle of the vehicle type E1, the output unit 130 causes the information terminal 30 of the user to output a pie chart RC indicating the suitability. Further, the output unit 130 causes the information terminal 30 of the user to output a bar chart RE indicating the evaluation value determined by the determination unit 120.

The user's suitability for the electric vehicle of the vehicle type E1 related to the power consumption is determined as follows, for example. An evaluation value of each of the above-mentioned five items (average speed, accelerator opening average value, brake pedal depression amount average value, total travel distance, and air conditioner setting change frequency) related to the travel history is equal to or greater than 0 and equal to or less than 18 in the example described above. The sum of the maximum values of these five evaluation values is 90.

Further, in the above example, the evaluation value related to the convenience of charging for the electric vehicle is a value of not less than 0 and not more than 10. That is, the maximum value of the evaluation value is 10. Therefore, the sum of the maximum values of six above-described evaluation values in all is 100.

It is assumed that each of the evaluation values determined based on the comparison result between the measured values of the five items related to the travel history and the reference values is set to 16. Further, it is assumed that the evaluation value related to the convenience of charging determined based on the charging convenience information is 5. In that case, the sum of all six determined evaluation values is 85. In FIG. 7, the six determined evaluation values are each indicated by a symbol of inverted triangle showing a position on an upper part of the bar chart RE.

The suitability of the user for the electric vehicle is obtained as a percentage value of the sum (85) of the determined evaluation values to the sum (100) of the maximum evaluation values. Therefore, the determination unit 120 determines that the suitability of the user for the electric vehicle of the vehicle type E1 is 85%, with respect to the electric power consumption. The output unit 130 causes the display unit 30S of the user's information terminal 30 to output 85% of the thus determined suitability. The pie chart RC in FIG. 7 shows the suitability of 85%. It should be noted that the suitability may be calculated by changing a weight assigned to each evaluation value.

The example shown in FIG. 7 corresponds to the vehicle type E1. When the user touches an icon NE corresponding to the vehicle type E2, the screen is switched to a screen showing the suitability of the user for the electric vehicle of the vehicle type E2, with respect to the electric power consumption.

Figure 8:
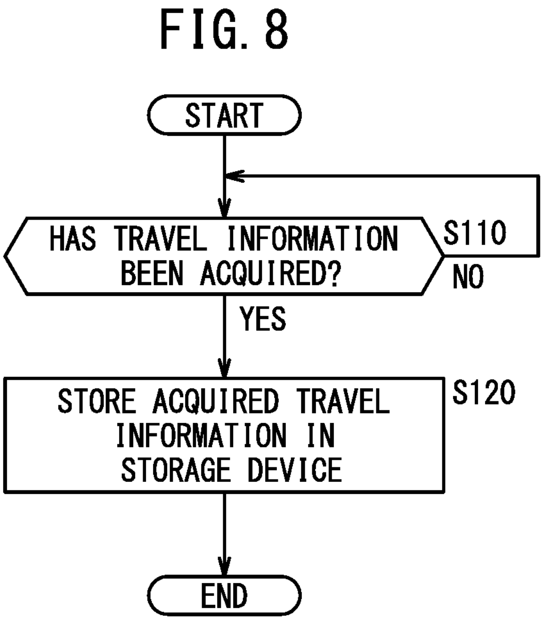
FIG. 8 is a flowchart illustrating a processing procedure relating to acquisition of travel information by the simulation device.

FIG. 8 is a flowchart illustrating a processing procedure relating to acquisition of the travel information 150 by the simulation device 10. This processing procedure is performed, for example, by the processing circuit 60 of the simulation device 10 executing a program stored in the storage device 70. When this processing procedure is started, in step S110, the travel information acquisition unit 100 determines whether or not the travel information 150 has been acquired from the internal combustion engine vehicle 40. If YES is determined in step S110, the processing procedure proceeds to step S120. If NO is determined in step S110, the processing procedure returns to step S110.

In step S120, the travel information acquisition unit 100 stores the acquired travel information 150 in the storage device 70. When the processing of step S120 is completed, this processing procedure is terminated.

FIG. 9 is a flowchart illustrating a processing procedure relating to determination of suitability for the electric vehicle by the simulation device 10. This processing procedure is performed, for example, by the processing circuit 60 of the simulation device 10 executing a program stored in the storage device 70. When this processing procedure is started, in step S310, the determination unit 120 reads out from the storage device 70 the tables 170 and 174 in which the reference values of suitability for an electric vehicle are set, the set value 180 relating to the convenience of charging, and the travel information 150.

In step S320, the output unit 130 causes the information terminal 30 of the user to output a charging convenience information input screen relating to the convenience of charging. In step S330, the charging convenience information acquisition unit 110 acquires the charging convenience information from the information terminal 30. In step S340, the determination unit 120 compares the measured values of a plurality of items relating to the travel history included in the travel information 150, with reference values set for each item.

In step S350, the determination unit 120 determines an evaluation value of each item relating to the travel history based on the comparison result in step S340. Further, the determination unit 120 determines an evaluation value relating to the convenience of charging based on the charging convenience information acquired in step S330 and the set value 180 relating to convenience of charging convenience read out in step S310.

In step S360, the determination unit 120 determines the suitability of the user for the electric vehicle with respect to the electric power consumption, based on the evaluation value determined in step S350. In step S370, the output unit 130 causes the information terminal 30 of the user to output the suitability determined in step S360 for each vehicle type. Further, the output unit 130 causes the information terminal 30 of the user to output also each evaluation value determined in step S350 for each vehicle type. When the processing of step S370 is completed, this processing procedure is terminated.

Invention Obtained from Embodiment

A description will be given below concerning invention that can be grasped from the above-described embodiment.

(1) The simulation device (10) includes the travel information acquisition unit (100) configured to acquire from the internal combustion engine vehicle (40) equipped with the internal combustion engine, the travel information (150) including the plurality of items relating to the travel history of the internal combustion engine vehicle, the storage device (70) configured to store the reference values (VL1, VU2) of suitability of the user for the electric vehicle with respect to the electric power consumption, the determination unit (120) configured to determine the suitability based on the comparison result between the measurement values (V1) of the respective items included in the travel information and the reference values, and the output unit (130) configured to cause the information terminal (30) of the user to output the determined suitability. Thus, the user can recognize whether or not the electric vehicle is suitable for the user. As a result, it is possible to promote vehicle replacement by the user.

(2) The plurality of items may include the average speed (V1) of the internal combustion engine vehicle. Thus, the suitability of the user for the electric vehicle is appropriately determined.

(3) The plurality of items may include the accelerator opening (A1) of the internal combustion engine vehicle by the user. Thus, the suitability of the user for the electric vehicle is appropriately determined.

(4) The plurality of items may include the depression amount (B1) of the brake pedal of the internal combustion engine vehicle by the user. Thus, the suitability of the user for the electric vehicle is appropriately determined.

(5) The plurality of items may include the total travel distance (D1) of the internal combustion engine vehicle. Thus, the suitability of the user for the electric vehicle is appropriately determined.

(6) The plurality of items may include a frequency (F1) of change of the set temperature of the air conditioner provided for the internal combustion engine vehicle, by the user. Thus, the suitability of the user for the electric vehicle is appropriately determined.

(7) The simulation device may further include the charging convenience information acquisition unit (110) configured to acquire charging convenience information about the convenience of charging the electric vehicle in accordance with the distance between the storage location of the internal combustion engine vehicle and the charging equipment, wherein the determination unit may determine the suitability based on the comparison result and the convenience of charging. Thus, the suitability of the user for the electric vehicle is appropriately determined.

(8) The electric vehicle may comprise the plurality of electric vehicles, the storage device may store the reference values for each of vehicle types (E1, E2, E3) of the electric vehicles, and the determination unit may determine the suitability for each of the vehicle types based on the comparison result for each of the vehicle types, and the output unit may cause the information terminal to output the suitability for each of the vehicle types. Thus, the user can determine which type of electric vehicle is suitable for the user.

The present invention is not limited to the above disclosure, and various modifications are possible without departing from the essence and gist of the present invention.

The invention claimed is:

1. A simulation device for determining suitability of an electric vehicle based on travel information of an internal combustion engine vehicle, the electric vehicle comprising a plurality of candidate electric vehicles of different models, said simulation device comprising:

a storage device configured to store predetermined reference values of suitability of a user for the electric vehicle with respect to electric power consumption, respectively, for the travel information including a plurality of items relating to a travel history of the internal combustion engine vehicle equipped with an internal combustion engine, said internal combustion engine vehicle comprising a plurality of sensors configured to acquire data for the plurality of items; and one or more processors that execute computer-executable instructions stored in a memory; and an information terminal of the user, said information terminal having an input screen, the internal combustion engine vehicle of the user is connected to the simulation device via a communication network such that the plurality of sensors acquire and send data for the plurality of items to said one or more processors;

wherein the one or more processors execute the computer-executable instructions to cause the simulation device to:

perform travel information acquisition to acquire travel information from the plurality of sensors corresponding to the plurality of items from the internal combustion engine vehicle;

determine the suitability based on a comparison result between measurement values of the respective items included in the travel information of the internal combustion engine vehicle and the reference values of suitability for the electric vehicle for respective corresponding items included in the travel information of the internal combustion engine vehicle; and cause the information terminal of the user to output the determined suitability of the electric vehicle, wherein the one or more processors further execute the computer-executable instructions to cause the simulation device to determine, for each of the plurality of items, an item-specific evaluation value for the electric vehicle based on the comparison result between the measurement value of the respective item and the reference value of suitability for the respective corresponding item; and wherein the determined suitability of the electric vehicle is obtained as a suitability score that is based on at least (i) a sum of the item-specific evaluation values determined for the plurality of items and (ii) a sum of maximum possible values of the item-specific evaluation values, wherein the plurality of items include an accelerator opening of the internal combustion engine vehicle by the user, and an accelerator opening average value is acquired by sensor data of a depression amount detection sensor of an accelerator pedal of the internal combustion engine vehicle, a time at which the sensor data are acquired, and a number of times the accelerator pedal is depressed, and wherein the one or more processors cause the simulation device to compare the accelerator opening average value, which is a measurement value, with a vehicle-specific reference value lower limit and a vehicle-specific reference value upper limit of the average value of the accelerator opening corresponding to each of the plurality of candidate electric vehicles of different models, if the accelerator opening average value is equal to or lower than the vehicle-specific reference value lower limit, the evaluation value of the accelerator opening average value corresponding to specific electric vehicle models is determined to be a first vehicle-specific evaluation value, and if the accelerator opening average value is equal to or larger than the vehicle-specific reference value upper limit, the evaluation value of the vehicle-specific accelerator opening average value corresponding to specific electric vehicle models is determined to be a second vehicle-specific evaluation value which is lower than the first vehicle-specific evaluation value, and if the accelerator opening average value is larger than the vehicle-specific reference value lower limit and smaller than the vehicle-specific reference value upper limit, the evaluation value of the vehicle-specific accelerator opening average value is determined to be a value larger than the second vehicle-specific evaluation value and smaller than first vehicle-specific evaluation value, the vehicle-specific accelerator opening average value being proportional to the electric power consumption such that the larger the electric power consumption becomes, the lower the vehicle-specific evaluation value of the accelerator opening average value corresponding to the specific electric vehicle model becomes, wherein when the user touches an icon on the information terminal corresponding to a next electric vehicle model, a screen of the information terminal displaying determined suitability of a first specific electric vehicle model is switched to a screen showing determined suitability of a next specific electric vehicle model, and to a screen showing determined suitability of another next specific electric vehicle model, which improves an efficiency of evaluating the determined suitability of the plurality of electric vehicles based on the travel information of the internal combustion engine vehicle thereby facilitating determination of suitability of one of plurality of electric vehicles for the user of the internal combustion engine vehicle as a potential replacement thereof.

2. The simulation device according to claim 1, wherein the plurality of items include an average speed of the internal combustion engine vehicle.

3. The simulation device according to claim 1, wherein the plurality of items include a depression amount of a brake pedal of the internal combustion engine vehicle by the user.

4. The simulation device according to claim 1, wherein the plurality of items include a total travel distance of the internal combustion engine vehicle.

5. The simulation device according to claim 1, wherein the plurality of items include a frequency of change of a set temperature of an air conditioner provided for the internal combustion engine vehicle, by the user.

6. The simulation device according to claim 1, wherein the one or more processors are configured to:

acquire charging convenience information about convenience of charging the electric vehicle in accordance with a distance between a storage location of the internal combustion engine vehicle and charging equipment; and determine the suitability based on the comparison result and the convenience of charging.

7. The simulation device according to claim 1, wherein the storage device stores the reference values for each of vehicle models of the electric vehicles, and the one or more processors are configured to:

determine the suitability for each of the vehicle models based on the comparison result for each of the vehicle models; and cause the information terminal to output the suitability for each of the vehicle models.

8. The simulation device according to claim 6, wherein the storage device stores the reference values for each of vehicle models of the electric vehicles, and the one or more processors are configured to:

determine the suitability for each of the vehicle models based on the comparison result for each of the vehicle models; and cause the information terminal to output the suitability for each of the vehicle models.

* * * * *